June 7, 1949.　　　　A. A. CAMPBELL　　　　2,472,092
DISPENSING AND MEASURING DEVICE

Filed April 8, 1942　　　　　　　　　　3 Sheets-Sheet 1

Inventor
Alvin A. Campbell

Attorneys

June 7, 1949.  A. A. CAMPBELL  2,472,092
DISPENSING AND MEASURING DEVICE
Filed April 8, 1942  3 Sheets-Sheet 3

Inventor
Alvin A. Campbell
By G. J. Kessenich & J. H. Church
Attorneys

Patented June 7, 1949

2,472,092

UNITED STATES PATENT OFFICE 2,472,092

DISPENSING AND MEASURING DEVICE

Alvin A. Campbell, Hackettstown, N. J.

Application April 8, 1942, Serial No. 438,060

7 Claims. (Cl. 222—264)

(Granted under the act of March 3, 1883, as amended April 30, 1928; 370 O. G. 757)

This invention relates to a volumetric measuring arrangement and more broadly to a dispensing arrangement.

An object of this invention is to provide a machine for weighing very small and accurate volumes of materials.

Another object of this invention is to provide a new and novel machine for the volumetric weighing and dropping of charges of high explosive with other finely divided dry powders with means as afterward explained for accurate control of volume.

The specific nature of the invention as well as other objects and advantages thereof will clearly appear from a description of a preferred embodiment as shown in the accompanying drawings in which:

Figure 4 is a sectional view taken substantially on line 4—4 of Figure 1.

Figure 1:
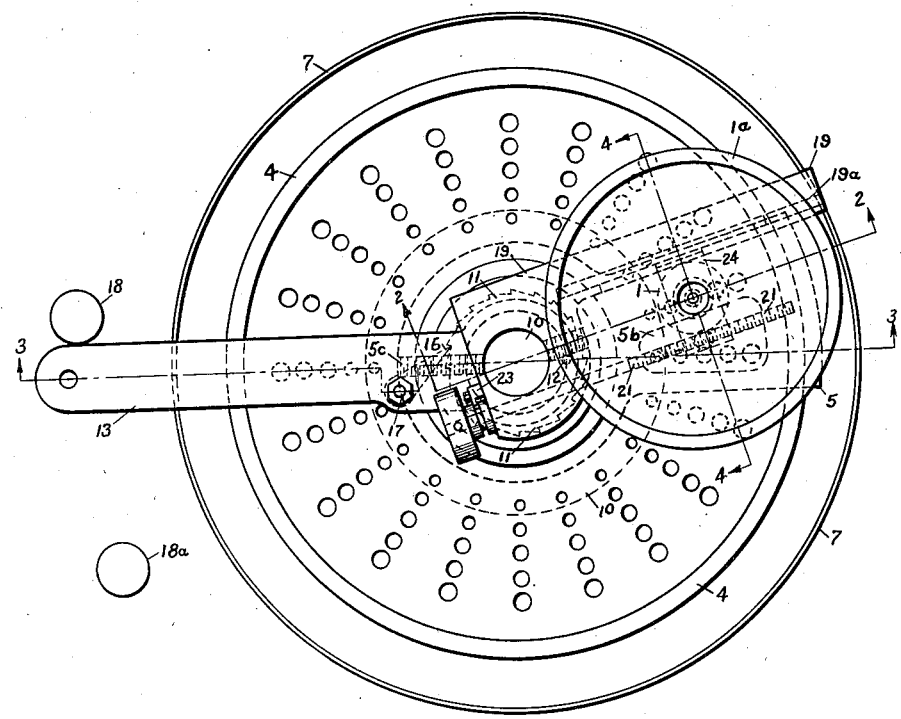
Figure 1 is a plan view of a preferred embodiment of my invention.

The apparatus disclosed herein consists essentially of a plate or disk 4 having a plurality of series of holes therethrough, each hole of a series being of the same dimension and spaced a constant distance from the center of the disk. Plate or disk 4 is rotatably mounted on spindle 10 with respect to stationarily mounted shoe 5. Shoe 5 has an exposed surface 5a which contacts the lower surface of disk 4 on a ground fit (Fig. 4). Material feeding mechanism F including tube 2 is radially and adjustably mounted above disk 4 with the axis of tube 2 extending through the exposed surface 5a of shoe 5.

Tube 2 snugly receives rubber tubing 3 at its lower end and rubber tubing 3 has its bottom end ground whereby it contacts the upper surface of plate or disk 4 without much friction and provides a leakless path for the flow of material from tube 2 to a correspondingly aligned hole in the plate or disk 4. It is thus seen from Fig. 4 that the walls of the holes of disk 4 cooperate with the ground exposed surface 5a of shoe 5 in providing a chamber for the powdered material from the feeding mechanism F. As the disk or plate 4 rotates tubing 3 levels off the material which is in the particular hole filled and as the disk or plate 4 further rotates the material confined in the hole drops by gravity into the passage 5b of shoe 5.

The feeding mechanism F comprises a suitable material storage chamber 1a, holder 1, tube 2, and adjustable retainer 24 having the plate 20 preferably welded thereto so as to form a guide in a corresponding groove 19a in the cross head 19. Cross head 19 is secured to spindle 10 as by means of set screw 19b and rotatably carries screw 21 which engages a correspondingly screw threaded portion in adjustable retainer 24 (Fig. 4) whereby the feeding mechanism F may be moved axially with respect to plate or disk 4 on cross head 19. It is thus seen that provision is made whereby any one of the plurality of series of holes in disk or plate 4 may be filled with material from the feeding mechanism F. The stop 23 screw threadedly mounted on cross head 19 prevents screw 21 from moving in its axial direction as it is turned in the alignment adjusting operation.

The lower ground surface of plate or holder 4 is biased into engagement with the upper exposed surface 5a of shoe 5 by the following expedient: shoe 5 is secured to spindle 10 as by means of set screw 5c; plate or disk 4 is mounted between shoe 5 and locking collar 14 which is held on spindle 10 as by means of set screw 14a; compression spring 15 prestressed between the fixed collar 14 and fixed shoe 5 causes intimate contact between the ground surface 5a and the lower surface of plate or disk 4.

Figure 2:
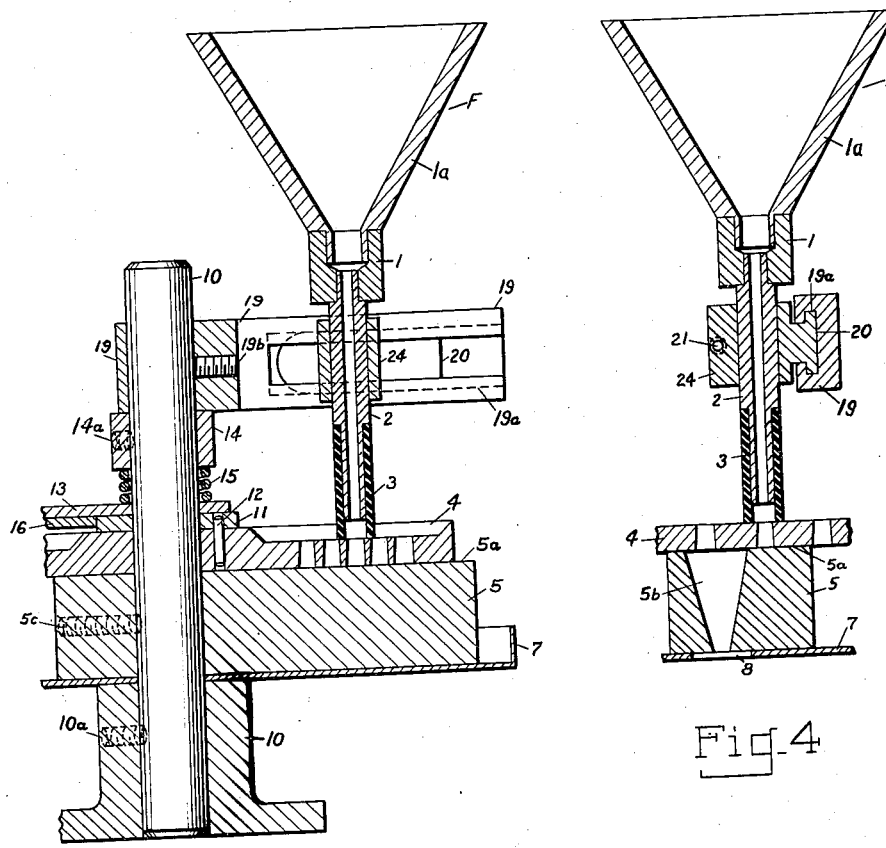
Figure 2 is a sectional view taken substantially on line 2—2 of Figure 1.
Figure 3:
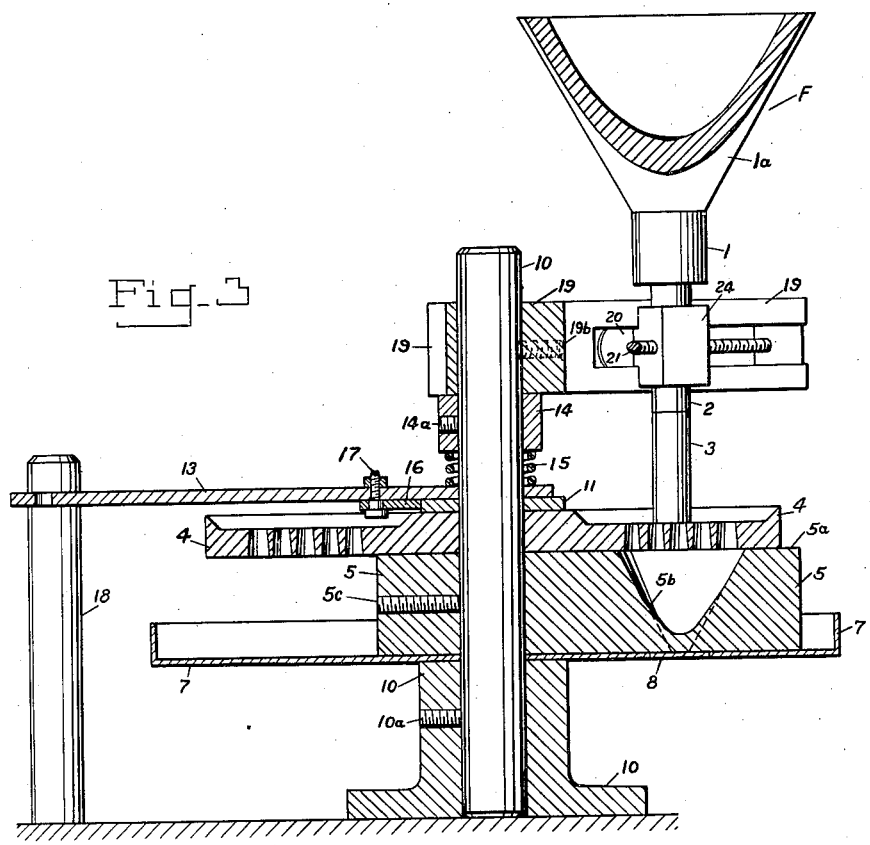
Figure 3 is a sectional view taken substantially on line 3—3 of Figure 1.

In the drawings, it is noted that adjacent holes of a given series are displaced a constant angular distance circumferentially. Provisions are made to rotate the plate or disk 4 in a pulsatory manner such that the plate or disk 4 is displaced the mentioned angular distance on each pulse. In the drawings the particular circumferential angular distance is 20° but it is understood, of course, that holes of a given series may be displaced a greater or less amount than 20°. The particular means for imparting a pulsatory movement to plate or disk 4 comprises: a lever 13 having a pawl 16 mounted thereon as by means of a stud 17; disk or plate 4 carries a cooperating ratchet wheel 11 as by means of a floating pin 12 (Fig. 2). It is noted that the angular distance of the teeth of ratchet wheel 11 bear the same relationship as do the holes of a given series in disk or plate 4. Also the apparatus is assembled so that the axis of tube 2 of the filling apparatus passes through the center of a particular disk hole when the disk operating lever 13 abuts against one of its stops 18.

Also it is noted that the mouth of passageway 5b of shoe 5 extends circumferentially a distance somewhat less than the above mentioned angular distance and extends radially to include radial holes of different series. Thus it will be seen that the operating lever 13 will have to be actuated back to its other stop 18a before a particular disk hole may be moved relative to the feeding apparatus, and it is within that time interval of motion to stop 18a that material may flow from the feeding mechanism F into a particular aligned disk hole.

Figure 5:
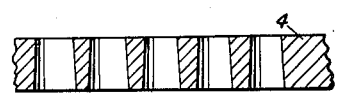
Figure 5 is an enlarged fragmentary sectional view showing the tapered feature of the disk holes and is a section cut by a plane passing radially through the center of the disk or plate 4.

As mentioned previously the disk or plate 4 has a plurality of series of holes therethrough, each hole of a series having the same physical dimensions and displaced an equal distance from the center of the disk. Holes of different series have different dimensions as seen in Fig. 5. Depending upon the density of the material in a particular batch the operator radially moves the feeding mechanism F whereby holes of a given series are filled when the disk or plate 4 is rotated by operating lever 13. This adjustment is made when it is desired to dispense a given weight of material from batches of different densities.

In order to prevent "bridging" of the material in the relatively small disk holes the disk holes have a cross section as disclosed in Fig. 5. Holes of this character are accurately and readily made by using a tapered reamer. Holes of a given series are dimensioned by bringing the reamer against a fixed stop, the stop being adjusted for holes of larger or smaller diameters in the other series.

This apparatus conveniently carries a drip pan 7 which is held between fixed shoe 5 and fixed base 10. Base 10 is secured to spindle 10 as by means of set screw 10a. The dispensed or measured material falls by gravity through outlet hole 8 (Fig. 4) in the drip pan 7.

In operation, the operator simply determines the number of "pulses" which have been imparted to the disk or plate 4 in order to ascertain the amount of material dispensed into the shoe passageway 5b.

I claim:

1. In a material dispensing apparatus, a disk having a plurality of series of holes therethrough, each hole of a series being disposed equidistant from the center of the disk, adjacent disk holes of a series being displaced an equal angular distance, a ratchet wheel having teeth displaced said equal angular distance mounted on the disk, a spindle, means for rotatably mounting the disk about the spindle, a cross head above the disk and extending outwardly from the spindle, filling apparatus radially adjustable on the cross head whereby the holes of a given series may be filled, a tube forming a part of the filling apparatus and abutting the upper disk surface on a ground fit, a shoe having an exposed surface which engages the lower disk surface on a ground fit and provided with a passageway mouth, said passageway mouth extending radially to include radially aligned holes in adjacent series and extending circumferentially somewhat less than said angular distance.

2. The same as in claim 1 and a lever having a ratchet engaging pawl thereon rotatably mounted on the spindle, stops for limiting the movement of the lever, one of said stops being so positioned that said filling apparatus tube becomes aligned with a disk hole when the lever engages said one stop.

3. In a material dispensing device a spindle, a shoe mounted on said spindle and having a flat upper surface and a material passageway therethrough, a disk rotatably mounted on said spindle and provided with a plurality of concentric circles of holes of different sizes therethrough, the lower surface of the disk being in engagement with the flat upper surface of said shoe, filling apparatus comprising a tube mounted above the disk and normal thereto, the lower end of the tube being in intimate contact with the disk and adapted to register successively with the holes in a circle of holes in the disk when the disk is rotated, and means for rotating the disk to bring a hole first in alignment with the tube and then in alignment with the material passageway in the shoe.

4. The invention of claim 3 characterized in that the material passageway in the shoe extends radially to encompass all of the holes in a radial line of holes in the disk so as to receive material passing through any one of said holes.

5. In a material dispensing device, in combination, a spindle, a shoe mounted on the spindle and having a flat upper surface and a material passage therethrough, a disk rotatably mounted on said spindle and having a plurality of concentric circles of holes, the lower surface of the disk being in engagement with the upper surface of the shoe, a radially extending arm mounted on the spindle above the disk, filling apparatus carried by the arm and adjustable longitudinally on said arm, said filling apparatus including a tube normal to the disk and whose lower end is in intimate contact with said disk, and means for adjusting the filling apparatus in said arm to bring its tube end into registry with the holes in any concentric circle of holes in the disk.

6. The invention of claim 5 characterized in that there is a step-by-step mechanism constructed and arranged to bring a disk hole in a circular row of holes into registry with the tube of the filling apparatus upon each operation of said mechanism.

7. In a material dispensing device, the combination of a disk provided with a plurality of concentric circles of equal sized apertures, the apertures of different circles being of different sizes, the apertures in the said plurality of concentric circles being disposed on common radial lines from the center of the disk, a spindle, means for rotatably mounting the said disk about the said spindle, a filling tube disposed above the said apertured disk, and a cross head supported by the said spindle, the said filling tube being mounted on the said cross head for radial adjustment relative to the said spindle, whereby the said filling tube may be aligned with a selected one of the said plurality of concentric circles of apertures.

ALVIN A. CAMPBELL.

REFERENCES CITED

The following references are of record in the file of this patent:

UNITED STATES PATENTS

| Number | Name | Date |
|---|---|---|
| 874,072 | Holl | Dec. 17, 1907 |
| 1,216,120 | Holcomb | Feb. 13, 1917 |
| 1,703,284 | Wolfe | Feb. 26, 1929 |
| 2,218,852 | Mandle | Oct. 22, 1940 |

FOREIGN PATENTS

| Number | Country | Date |
|---|---|---|
| 458,144 | Great Britain | Dec. 14, 1936 |